(12) United States Patent
Kress et al.

(10) Patent No.: US 8,257,001 B2
(45) Date of Patent: Sep. 4, 2012

(54) TOOL SYSTEM

(75) Inventors: Dieter Kress, Aalen (DE); Friedrich Häberle, Lauchheim (DE)

(73) Assignee: Mapal Fabrik fur Prazisionswerkzeuge Dr. Kress KG (DE)

( * ) Notice: Subject to any disclaimer, the term of this patent is extended or adjusted under 35 U.S.C. 154(b) by 1092 days.

(21) Appl. No.: 12/160,258

(22) PCT Filed: Jan. 9, 2007

(86) PCT No.: PCT/EP2007/000101
§ 371 (c)(1),
(2), (4) Date: Jul. 8, 2008

(87) PCT Pub. No.: WO2007/082652
PCT Pub. Date: Jul. 26, 2007

(65) Prior Publication Data
US 2009/0136303 A1    May 28, 2009

(30) Foreign Application Priority Data

Jan. 13, 2006 (DE) .......... 10 2006 001 739
Jan. 26, 2006 (DE) .......... 10 2006 003 686

(51) Int. Cl.
B23B 51/02 (2006.01)

(52) U.S. Cl. .......... 408/231; 408/233; 408/226

(58) Field of Classification Search .......... 408/230, 408/231, 233, 226, 227, 713
See application file for complete search history.

(56) References Cited

U.S. PATENT DOCUMENTS

| | | | |
|---|---|---|---|
| 5,863,162 A * | 1/1999 | Karlsson et al. | 408/230 |
| 6,626,614 B2 * | 9/2003 | Nakamura | 408/59 |
| 2001/0018013 A1 | 8/2001 | Eng et al. | 408/144 |
| 2002/0172569 A1 | 11/2002 | Nakamura | |
| 2003/0039523 A1 | 2/2003 | Kemmer | |
| 2005/0232716 A1 * | 10/2005 | Brink | 408/231 |

FOREIGN PATENT DOCUMENTS

| | | |
|---|---|---|
| DE | 102006005880 A1 * | 8/2007 |
| EP | 0 934 135 B1 | 8/2002 |
| EP | 1 310 312 A | 5/2003 |
| EP | 1 325 785 | 7/2003 |
| JP | 09011038 A * | 1/1997 |
| JP | 2003-136319 | 5/2003 |
| JP | 2003-517942 | 6/2003 |
| JP | 2005161462 A * | 6/2005 |
| WO | WO 02/05990 | 1/2002 |

OTHER PUBLICATIONS

International search Report dated May 7, 2007 issued in corresponding PCT application PCT/EP2007/000101.
English translation of International Preliminary Examination Report in corresponding application PCT/EP2007/000101.
Office Action dated Jan. 17, 2012 issued in corresponding Japanese Patent Application No. 2008-549820 with English translation (5 pages).

* cited by examiner

*Primary Examiner* — Daniel Howell
*Assistant Examiner* — Paul M Janeski
(74) *Attorney, Agent, or Firm* — Ostrolenk Faber LLP

(57) ABSTRACT

A tool system having at least two tool parts with opposed end contact surfaces which bear against one another in the region of an interface. The contact surfaces have a tooth system thereon including intermeshing teeth and recesses. The tooth system is shaped and positioned such that the contact surfaces can be fitted together only in at least one defined rotary angle position with respect to the center axis of the tool parts.

6 Claims, 5 Drawing Sheets

TOOL SYSTEM

CROSS REFERENCE TO RELATED APPLICATION

The present application is a 35 U.S.C. §§371 national phase conversion of PCT/EP2007/000101, filed Jan. 9, 2007, which claims priority of German Application No. 10 2006 001 739.0, filed Jan. 13, 2006 and German Application No. 10 2006 003 686.7, filed Jan. 26, 2006. The PCT International Application was published in the German language.

BACKGROUND OF THE INVENTION

The invention relates to a tool system having at least two tool parts which bear against one another in the region of an interface.

Tool systems of the type mentioned here are known in principle. The interfaces mentioned here serve to connect tool parts of a tool system to one another, whether a holder which can be connected to a machine tool and has a tool tip, a holder having an adapter or an intermediate piece, an adapter or an intermediate piece having a tool tip, an adapter or intermediate piece having a tool insert, adapters and/or intermediate pieces with one another, or the like. The tool parts mentioned here may also be selected in any desired manner in order to realize a desired tool system and adapt it to different applications. Provided between each two adjoining parts of a tool system is an interface, at which two tool parts of the tool system can be connected to one another. There may be a plurality of interfaces within a tool; this may therefore also be realized from more than two tool parts. The tool parts bearing against one another in the region of the interface have contact surfaces assigned to one another. A tooth system is provided in the region of the interface in order to transmit torque. The contact surfaces therefore have intermeshing teeth and recesses which transmit torque in the assembled state of the interface.

The tool system is designed in such a way that at least one coolant/lubricant passage is provided which passes through at least one tool part and which opens out in the contact surface of the tool part. In the assembled state of the interface, coolant/lubricant can be directed from one tool part over the interface to the other tool part.

At least one of the tool parts of a tool system of the type mentioned has at least one geometrically defined cutting edge with which chips are removed from a workpiece surface. During the machining of a workpiece, a coolant/lubricant cools and lubricates the at least one active cutting edge. It has been found that the tool parts in the region of the interface can be fitted together in various rotary angle positions, such that the coolant/lubricant feed is interrupted in the region of the interface. This is due to the fact that a coolant/lubricant passage of the one tool part is not in alignment with the other tool part adjoining in the region of the interface and the medium cannot pass over from the one passage into the other.

SUMMARY OF THE INVENTION

The object of the invention is therefore to provide a tool system with which the disadvantages mentioned here are avoided.

To achieve this object, a tool system is proposed which has the features disclosed herein.

In this tool system, an interface at which two tool parts bear against one another is provided. The contact surfaces, assigned to one another, of the tool parts have ribs and recesses in order to form a tooth system. The latter serves to reliably transmit a torque over the interface. The tool system is characterized in that the tooth system is designed in such a way that the contact surfaces can be fitted together only in at least one defined rotary angle position with respect to the center axis of the tool parts. On account of this configuration, it is possible to predetermine the orientation of the two tool parts assigned to an interface in such a way that a coolant/lubricant passage in a first tool part merges into a coolant/lubricant passage in the second tool part. Complete overlapping of the orifice of the first coolant/lubricant passage with the orifice of the second coolant/lubricant passage is preferably provided. However, it would also be possible to predetermine a rotary angle position in which at least partial overlapping of the two passages is ensured, said partial overlapping ensuring a sufficient media flow over the interface.

A preferred exemplary embodiment of the tool system is characterized in that at least one of the contact surfaces of the tool parts assigned to the interface has at least one prominence. In this case, provision is made for the opposite contact surface of the associated tool part to have at least one clearance portion. On account of this configuration, the two tool parts can be fitted together only in at least one defined rotary angle position with respect to the center axis of the tool parts, it being possible for the orientation of the two tool parts to be realized in a simple manner.

A further preferred exemplary embodiment of the tool system is characterized in that the prominence is an integral component of the associated tool part. It is therefore formed directly on the parent body of the tool part. It is therefore not necessary to provide a separate part which assumes the function of the angular orientation of the two tool parts in the region of the interface. It is thus especially simple to ensure the rotary angle position of the two tool parts.

A further preferred exemplary embodiment of the tool system is characterized in that more than one rotary angle position between the two tool parts is possible due to a plurality of prominences and clearance portions in the region of the contact surfaces. The tool system can thus cope with various demands in the region of the interface. It is also possible, for example, to select the orientation of the two tool parts in such a way that cutting edges, guide regions, in particular guide strips, chip discharge flutes and the like which are provided on a tool part are adapted to corresponding configurations on the other tool part.

Finally, especially preferred is an exemplary embodiment of the tool system in which a number of prominences and clearance portions are provided which are uniformly distributed as viewed in the circumferential direction. Such a configuration allows various rotary angle positions of the two tool parts to be permitted, the production of such uniform spacings being relatively simple and cost-effective.

BRIEF DESCRIPTION OF THE DRAWINGS

The invention is explained in more detail below with reference to the drawings, in which.

DESCRIPTION OF A PREFERRED EMBODIMENT

Figure 1:
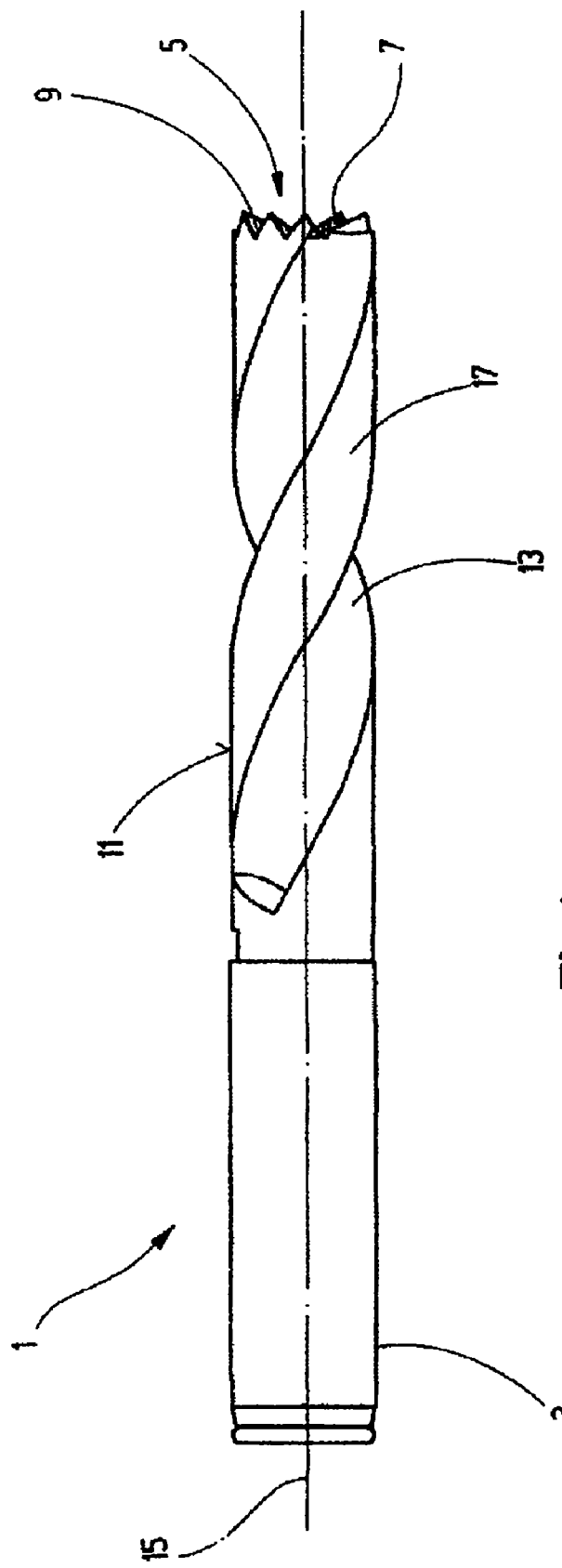
FIG. 1 shows a first tool part of a tool system in side view.

FIG. 1 shows a first tool part 1 of a tool system which can be connected via a suitable retainer, for example, to a machine tool or its tool spindle.

Here, the retainer is designed as a cylindrical shank 3. However, other fastening means, for example tapered shank designs or hollow shank connections, which are not dealt with in any more detail here, can also be used.

Formed on the opposite end face, remote from the shank 3, of the first tool part 1 is a contact surface 5, via which the first tool part 1 bears against a corresponding contact surface of a second tool part, an interface being formed in the region of the contact surfaces of the two tool parts. The two tool parts are firmly clamped against one another in the region of the interface; forces which press the two tool parts against one another in the region of the interface are therefore built up.

The contact surface 5 of the first tool part 1 has a number of teeth 7, between which recesses 9 lie. The number and configuration of the teeth and the recesses is ultimately not of crucial significance. It is important that the contact surface 5 of the first tool part 1 is designed in such a way that the teeth 7 and recesses 9 can engage in corresponding teeth and recesses in the contact surface of the second tool part and thus form a tooth system. The latter serves to transmit a torque introduced into the first tool part 1 over the interface to the second tool part.

The circumferential surface 11 of the first tool part has at least one flute 13 which, during use of the tool system and of the first tool part 1, serves to carry away chips from the machining point that have been removed from a workpiece.

The flute 13 can run more or less parallel to the center axis 15 of the first tool part or else, as here, along an imaginary helical line.

Lying between the turns of the flute are regions of the circumferential surface which lie on an imaginary cylindrical surface and can thus serve as guide regions 17.

It is known in principle to also realize guide regions by means of guide elements, in particular guide strips, which are inserted into the circumferential surface of a tool and are made of an especially hard material which on the one hand has optimum guide properties and on the other hand is distinguished by the fact that no material accumulations (welded-on portions) occur during the machining of bores.

Figure 2:
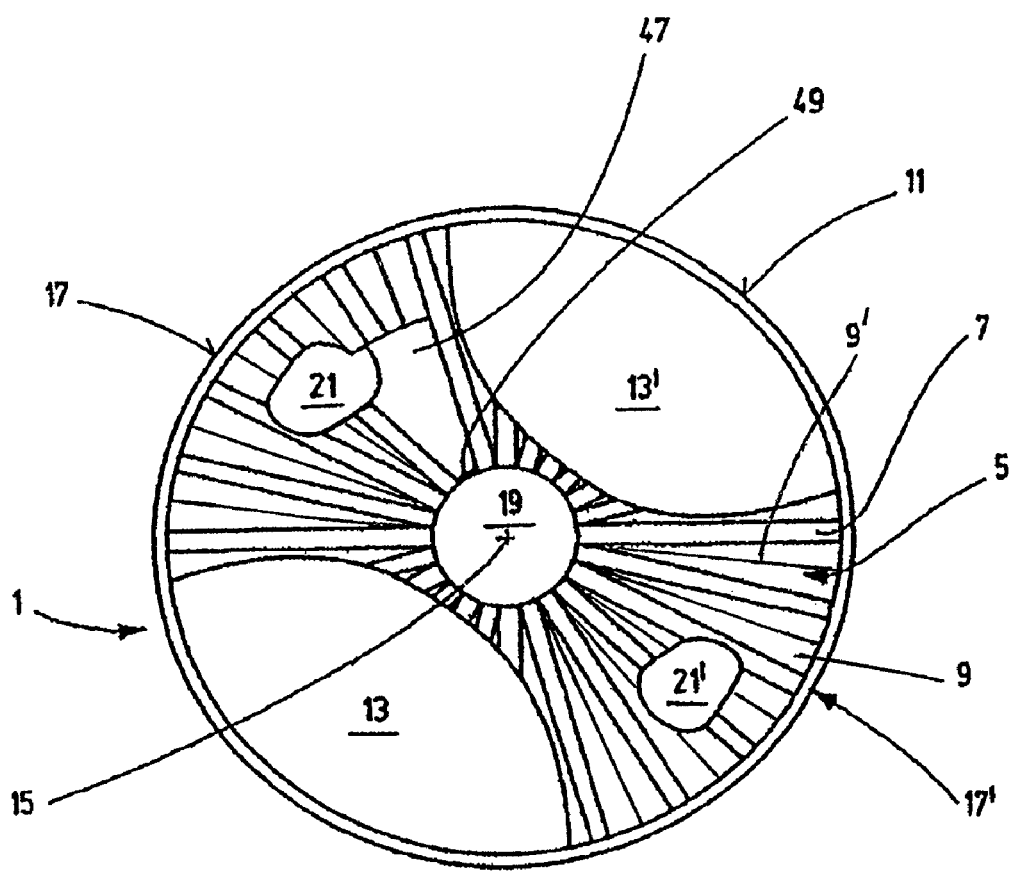
FIG. 2 shows an enlarged end view of the first tool part according to FIG. 1.

FIG. 2 shows the end face of the first tool part 1 in an enlarged illustration, namely the contact surface 5. It can clearly be seen that the first tool part shown here has two flutes 13 and 13' which are arranged symmetrically to one another. The teeth 7 and recesses 9 can also be seen, which here run radially and become wider from inside to outside, that is to say from the center axis 15 to the circumferential surface 11. The widening of the bottoms 9' of the recesses 9 from the center axis 15 to the circumferential surface 11 results from the widening of the teeth 7 from the center axis 15 to the circumferential surface 11, the bottoms 9' being located at the bases of the teeth 7.

It becomes clear from the end view according to FIG. 2 that the first tool part 1 has a through-opening 19 which accommodates a clamping element for clamping two tool parts in the region of the interface. It is conceivable to use a tie rod passing through the first tool part and engaging in the second tool part, or else a screw which passes through the second tool part (not shown here) and interacts with an internal thread in the through-opening 19.

In addition, it can be seen that the first tool part has at least one, here two coolant/lubricant passages 21, 21', which open out in the contact surface 5 and serve to transfer a coolant/lubricant to the second tool part (not shown here).

Figure 3:
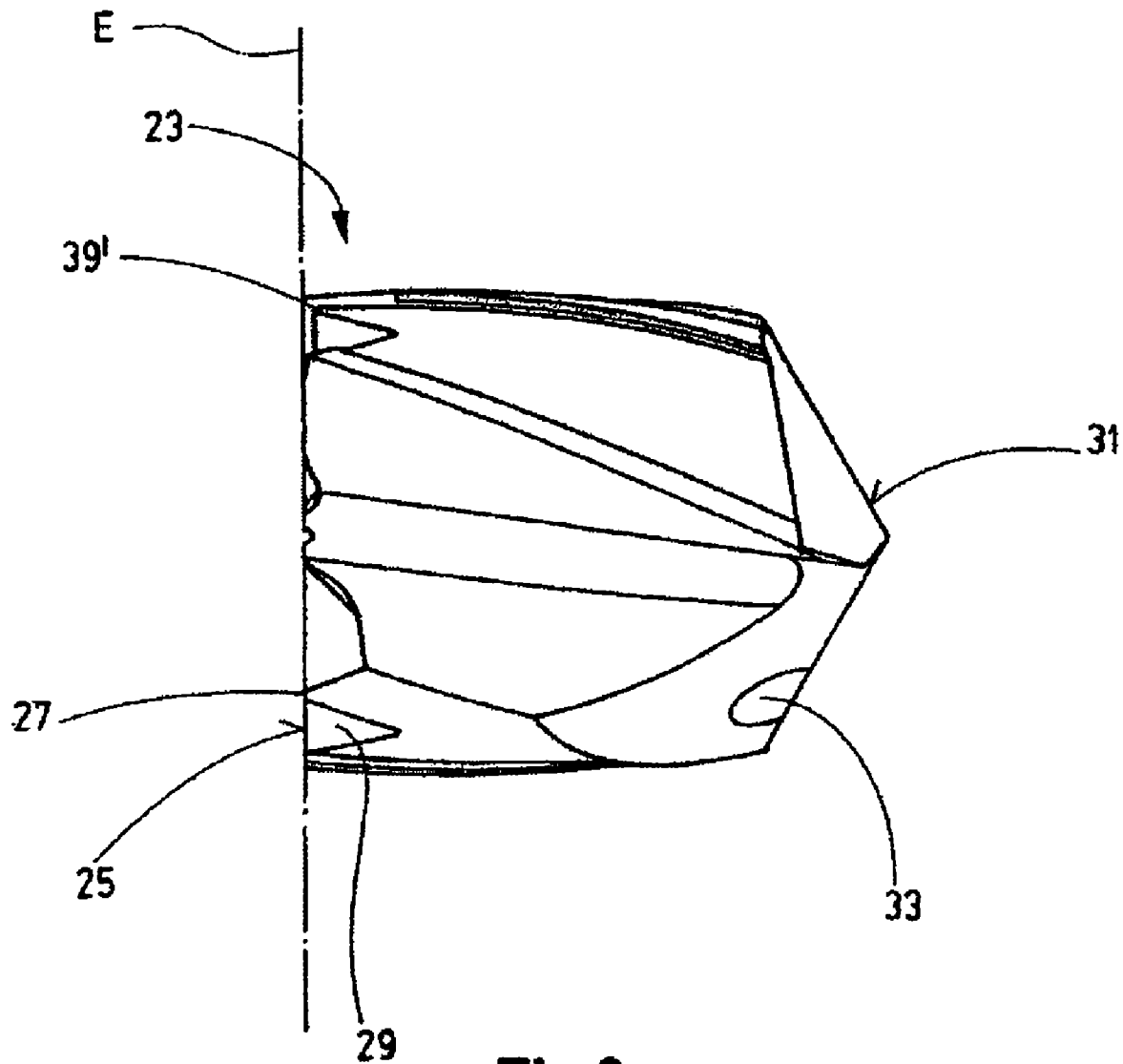
FIG. 3 shows a second tool part of the tool system in side view.

FIG. 3 shows a second tool part 23 of a tool system in side view. Here, by way of example, this second tool part 23 is a tool tip which can be put onto the first tool part 1, which is designed here as a parent body. The second tool part 23 has a contact surface 25 which is provided with teeth 27 and recesses 29 in order to realize a tooth system. If the second tool part 23 is therefore put with its contact surface 25 onto the contact surface 5 of the first tool part 1, an interface is created which has a tooth system in order to be able to transmit a torque from the first tool part 1 to the second tool part 23.

The end face 31, opposite the contact surface 25, of the second tool part 23 is designed here as a drill point. A contact surface having teeth and recesses could also be provided here in order to realize a further interface. The second tool part 23 is also provided with at least one coolant/lubricant passage which opens out in the end face 31 and also in the contact surface 25. It is thus possible to deliver a coolant/lubricant through the first tool part 1 into the second tool part 23 over the interface.

Figure 4:
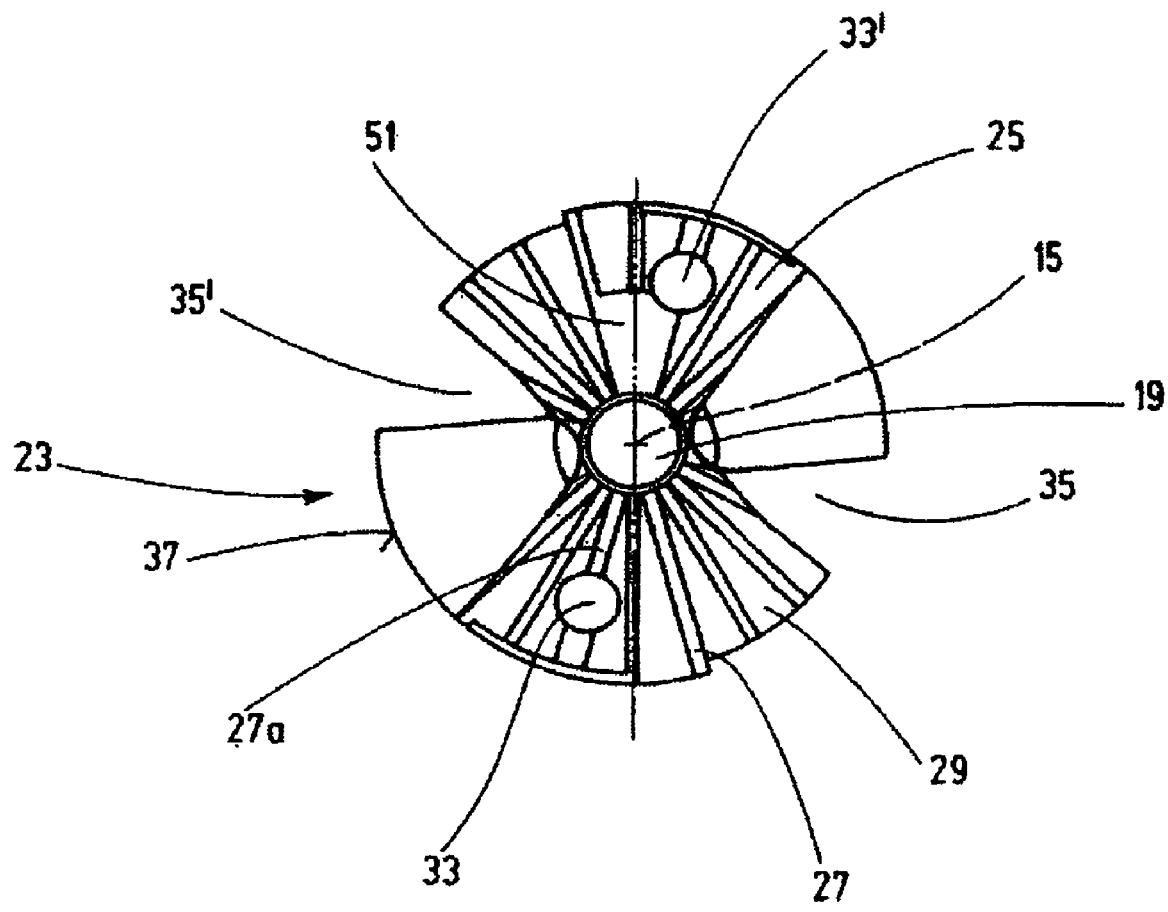
FIG. 4 shows a rear view of the second tool part according to FIG. 3.

The rear view, shown in FIG. 4, of the second tool part 23 shows the contact surface 25 with the teeth 27 and the recesses 29. It can also be seen that the second tool part 23 also has at least one, here two symmetrical flutes 35 and 35', via which the chips of a workpiece that are removed by the second tool part 23 can be discharged from the machining region.

It can be seen in this view that the second tool part has two diametrically opposite coolant/lubricant passages 33 and 33'. Through the coolant/lubricant passages 33 and 33' opening out in the contact surface 25, a coolant can enter the second tool part 23 from the first tool part 1 via its coolant/lubricant passages 21, 21' and can issue from the end face 31.

The rear view of the second tool part 23, which has also been shown in FIG. 3, shows that the contact surface 25 is provided with a number of teeth 27 and recesses 29 which here run radially relative to the center axis 15 of the second tool part 25 and adjoin a through-opening 19 provided here too. They are part of a tooth system, realized in the assembled state of the two tool parts, in the region of the interface.

The plan view of the second contact surface 25 also shows the at least one coolant/lubricant passage 33. Here, a diametrically opposite second coolant/lubricant passage 33' is provided. This illustration shows the flutes 35 and 35' which serve for the discharge of chips removed by the at least one geometrically defined cutting edge of the second tool part 23 and are either arranged essentially parallel to the center axis 15 or run along an imaginary helical line.

The flutes 35 and 35' are incorporated in the circumferential surface 37 of the second tool part 23. The width and depth of the flutes are adapted to the respective application.

Figure 5:
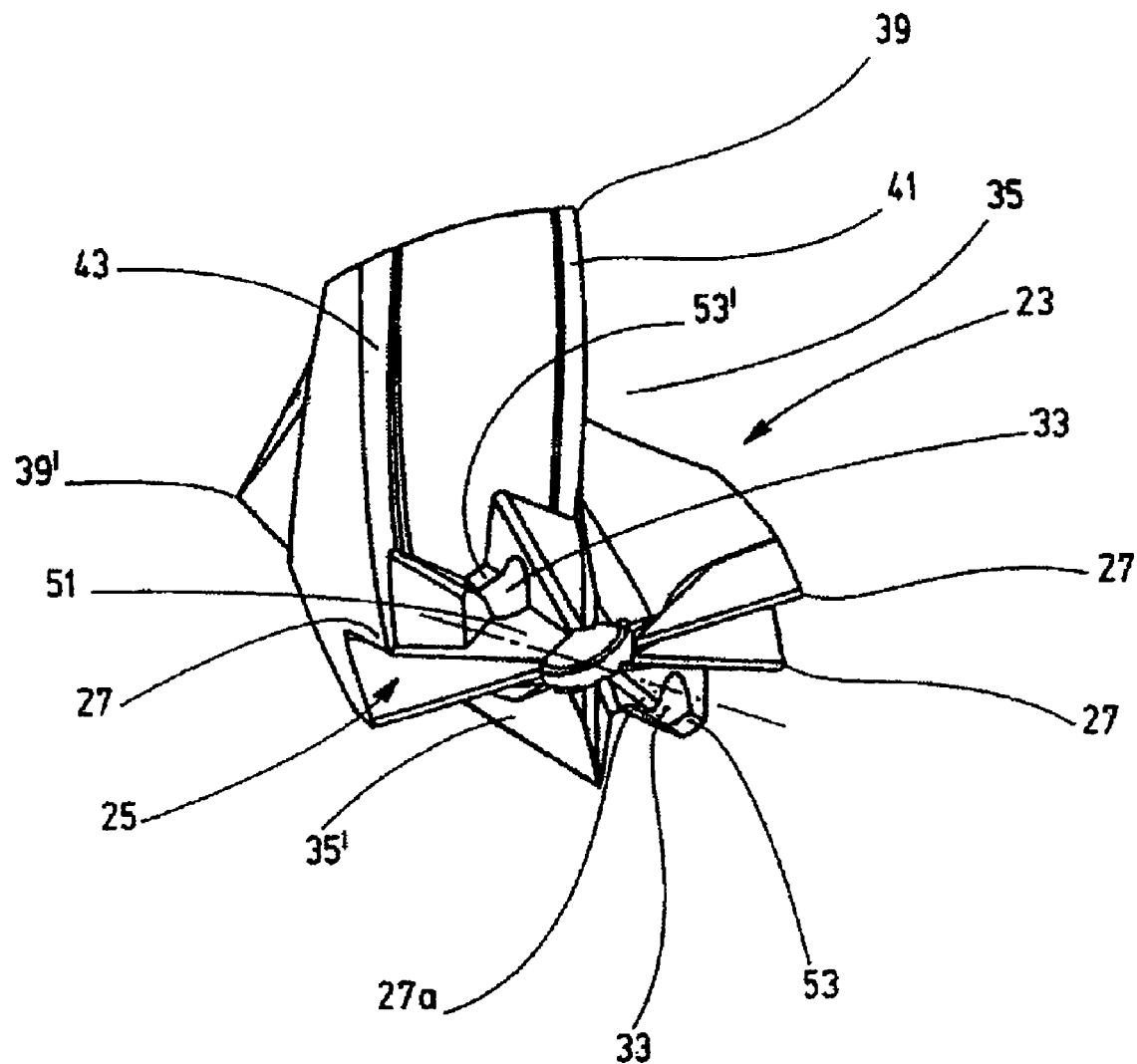
FIG. 5 shows a perspective rear view of the second tool part according to FIG. 3.

FIG. 5 shows a perspective view of the contact surface 25, reproduced in FIG. 4, of the second tool part 23. The same parts are provided with the same designations, such that reference is made in this respect to the preceding figures in order to avoid repetitions.

This perspective illustration also shows that the two coolant/lubricant passages 33, 33' open out into the contact surface 25. It is thus possible to direct a medium into the second tool part 23 via the coolant/lubricant passages 21, 21' of the first tool part 1 and to pass it on to the cutting edges of the second tool part.

It can be seen from the illustration according to FIG. 5 that the second tool part 23 has a geometrically defined cutting edge 39, which removes chips from a workpiece when the second tool part 23 is used. Here, provision is made for a geometrically defined cutting edge 39' to be located diametrically opposite the cutting edge 39.

The chips removed by the cutting edges 39, 39' pass into the flutes 35, 35' and can thus be discharged from the machining region.

A guide bevel 41 adjoins the cutting edge 39. The guide bevel of the cutting edge 39' cannot be seen here.

A second guide bevel 43 is provided at a distance from the guide bevel 41, as measured in the circumferential direction, said second guide bevel 43, like the first guide bevel 41, guiding the second tool part 23 during the machining of a workpiece.

A flute 35 is more or less obtained between the bevels, said flute 35 being set back relative to the bevels.

The flute 35 can extend essentially parallel to the center axis 15 of the second tool part 23 or else can run along an imaginary helical line.

In the illustration according to FIG. 5, the second tool part 23 is moved forward in the direction of its center axis 15 during the machining of a workpiece, such that coolant/lubricant issuing from the coolant/lubricant passages 33, 33' in the region of the end face 31 can be directed into the flute 35.

The way in which a defined rotary angle position of the two Tool parts 1 and 23 with respect to the center axis 15 can be realized by special configuration of one or both contact surfaces will be dealt with in more detail below.

First of all, FIG. 2, which reproduces the contact surface 5 of the first tool part 1, is considered in more detail.

In the region of its contact surface 5, the first tool part 1 shows an aperture which is also designated as clearance portion 47 and in which a prominence, which will be dealt with in more detail below, can engage.

The way in which the contour of the clearance portion 47 is formed and how many clearance portions are provided in the region of the contact location 5 are not of crucial importance for realizing the defined rotary angle position in the region of the interface.

In the exemplary embodiment shown here, the clearance portion 47 is designed essentially like a segment of a circle. It ends directly in front of the through-opening 19 and is separated from the latter by a web 49. The clearance portion 47 is sealed off from the through-opening 19 in a fluid-tight manner by this web 49.

The length of the clearance portion 47 as measured in the radial direction is selected here in such a way that said clearance portion 47 does not extend right up to the circumferential surface 11 of the first tool part 1.

In the exemplary embodiment shown here, the coolant/lubricant passage 21 intersects the clearance portion 47. Since sealing is ensured both relative to the through-opening 19 by the web 49 and relative to the circumferential surface 11, the medium present in the coolant/lubricant passage in the assembled state of the interface cannot escape.

However, it is also conceivable to completely separate the coolant/lubricant passage 21 from the clearance portion 47, such that the medium in said passage cannot pass into the region of the clearance portion 47.

FIG. 4, which shows a plan view of the contact surface 25 of the second tool part 23, is considered in more detail below.

Here, it can be seen that the contact surface 25 has at least one prominence 51 which is preferably designed as a filling element and in such a way that it can engage in the clearance portion 47 of the first tool part 1.

The arrangement of the prominence 51 in the contact surface 25 of the second tool part 23 ensures that the two tool parts 1 and 23 can only be fitted together in the rotary angle position in which the prominence 51 engages in the clearance portion 47.

The arrangement of the clearance portion 47 in the first tool part 1 on the one hand and of the prominence 51 on the second tool part 23 on the other hand can thus ensure that the orifices of coolant/lubricant passages are completely or partly in alignment with one another and a coolant/lubricant can be delivered over the interface. It can also be ensured that flutes 13, 13' on the first tool part 1 are in alignment with flutes 35, 35' on the second tool part 23, such that chips can readily be transferred from the region of the second tool part 23 into the region of the first tool part 1.

It is especially cost-effective if the prominence 51 is formed in one piece with the second tool part 23, that is to say that it is fashioned from the parent body of the second tool part 23. This can be realized, for example, by electrical discharge Machining processes or laser processes, but also by metal injection molding (MIM), or sintering processes.

FIG. 5 shows the contact surface 25 of the second tool part 23 in a perspective view. The same parts are provided with the same designations, such that in this respect reference is made to the description with regard to FIG. 4.

FIG. 5 shows that the prominence 51 is designed in such a way that it lies in a plane with the highest points of the teeth 27. However, the height of the prominence 51 can be freely selected and can be adapted to various means of realizing the interface.

It can also be seen from FIG. 5 that the tooth which intersects the coolant/lubricant passages 33, 33' of the second tool part 23 has a reduced region 53, 53', such that the coolant/lubricant passages are not completely closed off by the teeth of the first tool part 1 when the interface is assembled. On the contrary, an outlet is obtained which starts radially from the coolant/lubricant passages 33, 33' and via which the medium directed in the passages can issue radially.

The defined rotary angle position of the two tool parts 1 and 23, which is ensured by the clearance portion 47 and the prominence 51, enables specific outlets to be realized at defined positions in this way, for example in order to ensure the lubrication of the guide bevels, in particular the guide bevel 43.

From the explanations with regard to FIGS. 1 to 5, it becomes clear that the defined rotary angle position of the two tool parts 1 and 23 assigned to an interface can be realized in a simple manner. In this case, it is not important how many clearance portions and prominences are provided and it is also not important whether the clearance portion is provided on the first tool part 1 and the prominence 51 on the second tool part 23. The clearance portion and the prominence can thus be interchanged. It is also conceivable to provide clearance portions and prominences of complementary design on both contact surfaces 5 and 25 and thus ensure defined rotary angle positions.

More than one rotary angle position between the two tool parts can be made possible by defining the number of clearance portions and prominences.

Especially preferred is a tool system in which prominences and clearance portions are provided at the same circumferential distance from one another, which simplifies the production.

The defined rotary angle position of two adjoining tool parts of an interface can ensure various functional features, for example the transfer of coolant/lubricant over the interface, the continuation of flutes of one tool part into flutes of the other tool part, the continuation of guide regions in one tool part in the other tool part. There may therefore be a number of reasons which necessitate an exact rotary angle orientation of the two tool parts in the region of the interface. In all cases, a simple solution for realizing this positioning is ensured here.

The invention claimed is:

1. A tool system comprising:
   at least two tool parts which rotate together, around a center axis, each tool part having a respective contact surface, the respective contact surface of each of the two tool parts being opposed and bearing against one another in the region of an interface;
   a tooth system of intermeshing teeth and recesses being provided in the contact surfaces, the teeth and the recesses extending radially such that the width of the teeth and the recesses increases from the inner end of the teeth and the recesses to the outer end of the teeth and the recesses, the inner end of the teeth and the recesses being closer to the center axis of the tool parts than the outer end of the teeth and the recesses,
   at least one of the contact surfaces also having at least one prominence and the tooth system including at least two teeth on the at least one contact surface, and the prominence comprising a filling element between the two teeth, and another contact surface having at least one clearance portion in which the at least one prominence may be received, the at least one prominence and the at least one clearance portion defining at least one rotary angle position, with respect to the center axis of the tool parts, in which the contact surfaces bear against one another in the region of the interface.

2. The tool system according to claim 1, wherein the at least one prominence comprises a plurality of prominences and the at least one clearance portion comprises a plurality of clearance portions, the plurality of the prominences and the clearance portions, being positioned and shaped to define a plurality of the rotary angle positions, with respect to the center axis of the tool parts, in which the contact surfaces bear against one another in the region of the interface.

3. The tool system according to claim 2, wherein a plurality of the prominences and the clearance portions are uniformly distributed when viewed in the circumferential direction.

4. The tool system of claim 2, wherein the intermeshing teeth extend in a radial direction over the contact surfaces.

5. The tool system of claim 2, further comprising elements of the first and second tool parts extending in the direction along the central axis and extending from one of the tool parts to the other of the tool parts, wherein the elements of the tool parts are to be aligned at the interface; the prominences and the clearances being so placed on the contact surfaces such that at least one selected rotary position of the tool parts with respect to each other, the elements are aligned.

6. The tool system of claim 5, wherein the elements include at least one of coolant passages through the tool parts and flutes on the peripheral surfaces of the tool parts.

* * * * *